United States Patent [19]
Zarlengo

[11] 3,753,385
[45] Aug. 21, 1973

[54] MOUNTING ADAPTER FOR CUTTING TOOLS

[76] Inventor: Vincent Zarlengo, 3530 Chase St., Wheatridge, Colo. 80212

[22] Filed: Aug. 6, 1971

[21] Appl. No.: 169,672

[52] U.S. Cl. .................................. 90/31, 29/23.5
[51] Int. Cl. .............................................. B23d 5/02
[58] Field of Search ................ 90/11 A, 11 C, 11 R, 90/31; 82/1.4, 19; 29/23.5

[56] References Cited
UNITED STATES PATENTS
3,143,923   8/1964   Krzyszczuk ............................ 90/31

*Primary Examiner*—Francis S. Husar
*Attorney*—Wm. G. Edwards et al.

[57] ABSTRACT

An adapter for mounting cutting tools on milling machines, lathes, drill presses and the like comprises a body having an attaching extension for engagement by the chuck or other attaching device of the milling machine, a cutting tool attaching member movable axially with respect to the body and a control member arranged to be held stationary with respect to the milling machine. Cam members on the body and on the tool attaching member produce movement of the cutting tool such that it may move periodically or intermittently into and out of engagement with the work.

5 Claims, 19 Drawing Figures

INVENTOR
VINCENT ZARLENGO
BY McGrew and Edwards
ATTORNEYS

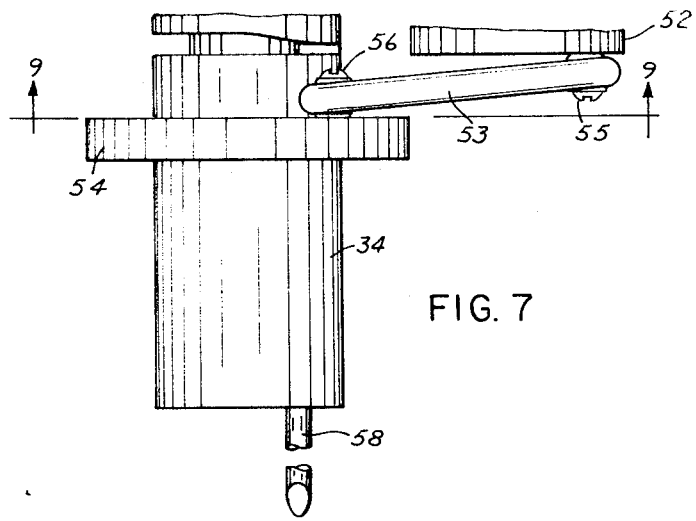
FIG. 7
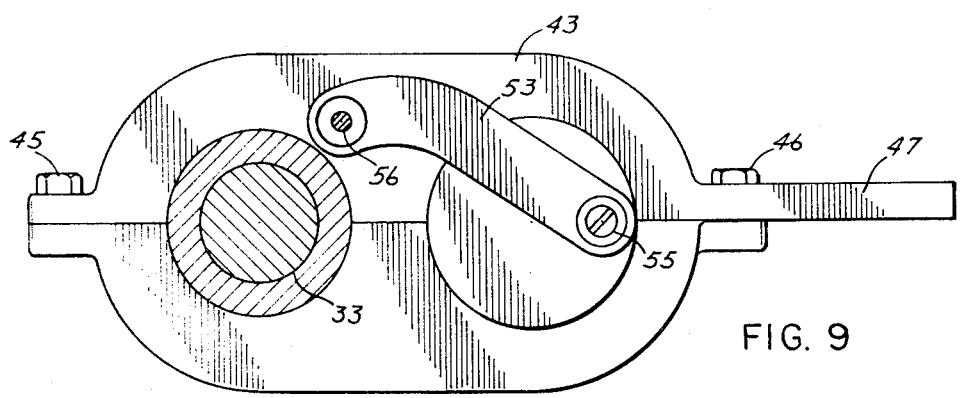
FIG. 9
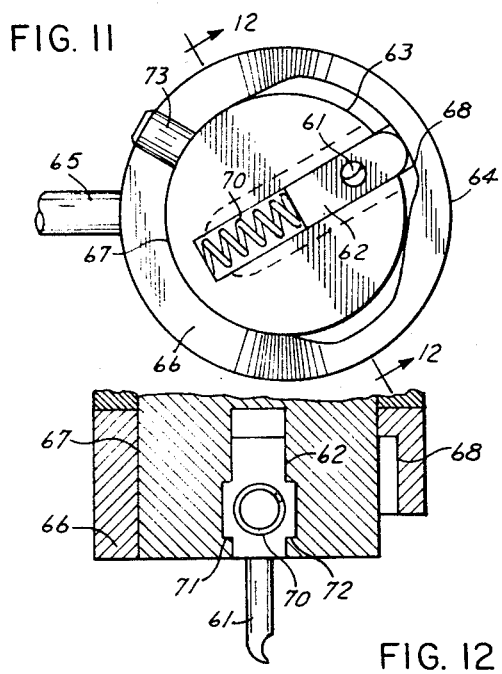
FIG. 11
FIG. 12
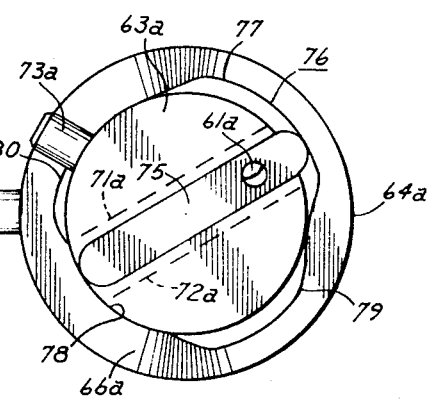
FIG. 13
INVENTOR
VINCENT ZARLENGO
BY McGrew & Edwards
ATTORNEYS

INVENTOR
VINCENT ZARLENGO
BY
ATTORNEYS

MOUNTING ADAPTER FOR CUTTING TOOLS

This invention relates to tool holders or adapters for securing cutting tools on milling machines, lathes, drill presses and the like and particularly to an improved adapter for effecting periodic movement of the cutting tool into engagement with the work.

Machine tools, such as milling machines, lathes and drill presses have been designed to perform a wide variety of operations which may be programmed in a predetermined series of steps to provide the design configuration of a product to be produced thereby. Such machine tools in general are designed for use to manufacture products on a quantity production basis and are used to perform their specific operations over extended periods of time. These production machines require substantial time for resetting, servicing and programming to perform a different operation. The operators of machine shops desire to utilize their machine tools for as wide a range of functions as possible and it is desirable to simplify the setting up of a machine tool to perform specific operations while at the same time making it possible to change quickly the function of the machine to utilize it for other operations. It is desirable to provide simple and effective mechanisms to increase the range of operations which may be performed on a single machine tool, such as milling machine, and which also facilitate the changing or different setting up of the machine for other operations with as little lost time as possible. Accordingly, it is an object of the present invention to provide a cutting tool adapted for milling machines and the like for effecting repeated cutting operations quickly in a direct and simple manner.

It is another object of this invention to provide an adapter for cutting tools which facilitates the mounting of the tools on a machine tool such as a milling machine, lathe, drill press or the like and includes an improved arrangement for facilitating the movement of the tool intermittently into and out of engagement with the work.

It is another object of this invention to provide a cutting tool adapter for milling machines and the like which requires no change in the structure of the milling machine and which may be readily attached to the chuck or spindle of the machine to facilitate operation of the machine in producing a series of cuts at spaced intervals along the work by a single continuous operation.

Briefly in carrying out the objects of this invention in one embodiment thereof, a cutting tool mounting adapter or adapter assembly is provided which may be secured directly to the chuck or head of the milling machine, lathe or other equipment with which it is to be used. The adapter comprises a main body portion and a cutting tool mounting portion which may be moved axially with respect to the body portions; a control member is provided which may be held stationary, and when held stationary, effects axial movement of the cutting tool mounting member with respect to the body portion by engagement of cams provided for this purpose. When the tool is mounted eccentrically with respect to the axis of rotation of the adapter, the tool may be brought into engagement with the work periodically once during each revolution, by way of example, and a predetermined cut made in the work. By stepping or indexing the work forward during the period when the tool is out of engagement, a second cut spaced from the first cut may be made followed by the remaining steps required to complete the operation. It will be understood that the movement of the cutting tool to produce a plurality of cuts in order to provide the required depth of cut will be made using the conventional controls of the milling machine or other machine tool. In other embodiments of the invention, lateral or radial movement of the machine tool may be made by cam operation effected by interaction of the control member and tool holder of the adapter assembly and in a further embodiment the tool may be rotated on its own axis while it is rotated about the machine tool axis and is moved intermittently toward and away from the work.

The features of novelty which characterize this invention are pointed out with particularity in the claims annexed to and forming a part of this specification. The invention itself, however, both as to its organization and manner of operation together with further objects and advantages thereof will best be understood by reference to the following description taken in connection with the accompanying drawings, in which:

FIG. 7 is a partial sectional elevation of the assembly of FIG. 5 shown with the cutting tool moved downwardly and into its extreme right hand position;

FIG. 9 is a bottom view of the assembly of FIG. 5 shown in the position of FIG. 7 and along the line 9—9 of FIG. 7;

FIG. 11 is a partial view of an assembly similar to that of FIG. 1 illustrating an embodiment including a cam drive for moving the tool laterally of the drive axis;

FIG. 12 is a sectional view along the line 12—12 of FIG. 11;

FIG. 13 is a view similar to FIG. 11 illustrating another embodiment for effecting movement of the cutting tool;

Figure 1:
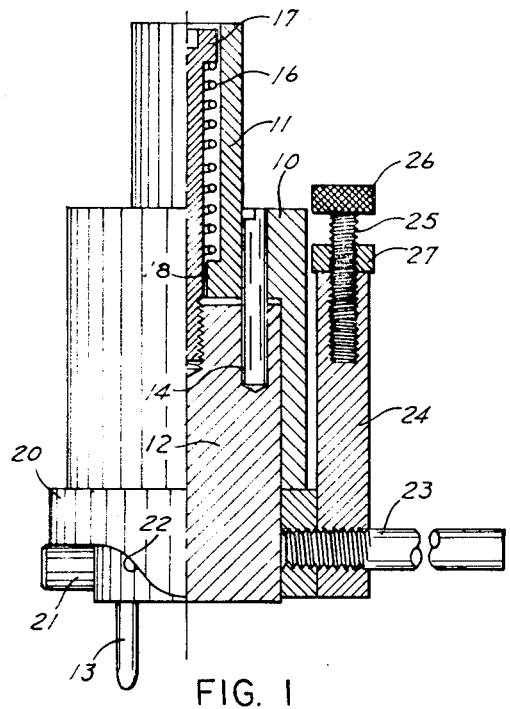
FIG. 1 is a side elevation view partly in section of a cutting tool adapter embodying the invention.
Figure 2:
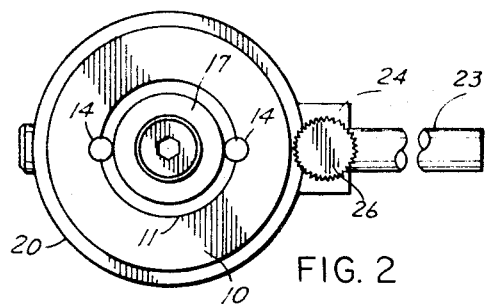
FIG. 2 is a top plan view of the adapter of FIG. 1.
Figure 3:
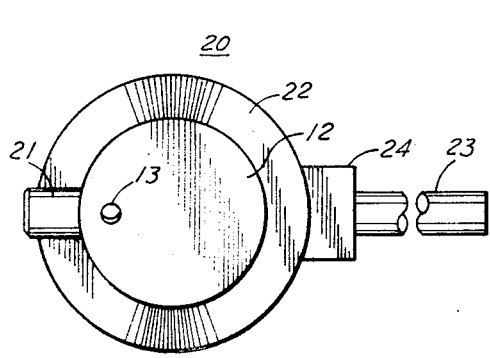
FIG. 3 is a bottom view of the adapter of FIG. 1.

Referring now to the drawings, the cutting tool mounting assembly illustrated in FIGS. 1, 2 and 3 comprises a generally cylindrical body portion 10 provided with an upwardly extending stub or connecting shaft 11 and carrying within the body 10 a cylindrical cutting tool holder 12 having a cutting tool 13 removably attached therein and extending axially downwardly from the holder 12 in a position spaced from the axis of rotation of the shaft 11. The shaft 11 has been illustrated as formed integrally with the body 10 and the tool holder 12 is axially movable within a complementary cylindrical passage in the body 10. The body 10 drives the holder 12 rotatably about the axis of the assembly through two pins 14 secured by a press fit to the holder 12 and extending for sliding movement in openings or passages in the body 10. The holder 12 is biased to its upward position by a compression spring 16 carried about a threaded bolt or guide 17 which is threaded into the holder 12 and retains the spring between an internal shoulder 18 on the body 10 and the head of the guide member 17.

In order to move the tool axially of the assembly a collar 20 is fitted about the lower portion of the body 10 and is freely rotatable with respect thereto. The collar is retained in position on the body 10 by a cam follower 21 which engages a cam surface 22 on the lower side of the collar 20. The collar 20 is restrained from movement by an arm 23 extending laterally from the collar and which is arranged to be engaged by a suitable stationary part of the milling machine or other machine tool with which the assembly is used. In addition, an upwardly extending bar 24 which extends parallel to the body 10 is secured to the collar 20 by the threaded arm 23 or in any other suitable manner and is provided with a suitable adjusting bolt including a threaded shaft 25 and a head 26, the head being adjustable into a position to engage a portion of the headstock adjacent the machine drive of the milling machine or other machine tool on which the assembly is mounted. A lock nut 27 is provided to hold the threaded member 25 in its desired adjusted position. The head 26 is preferably knurled to facilitate its use as a thumb screw for adjusting the position of the threaded member 25. The lock nut 27 may also be knurled for the same purpose.

Figure 4:
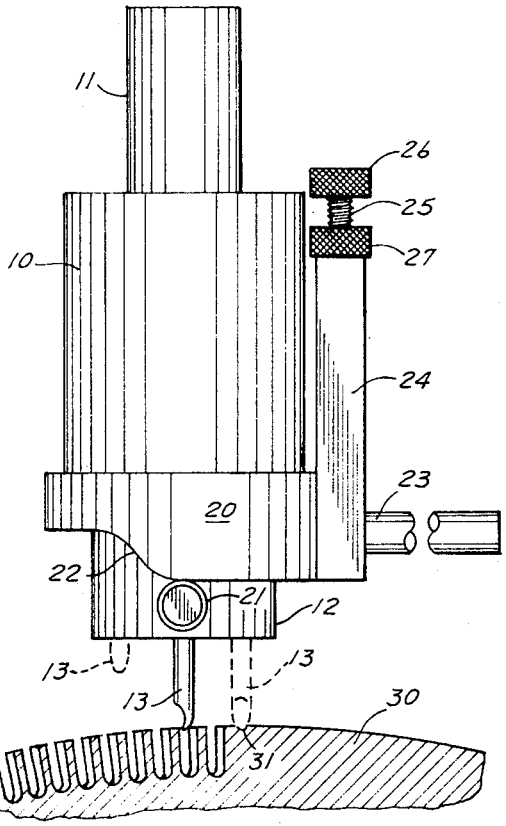
FIG. 4 is a side elevation view similar to FIG. 1 with the cutting tool turned through 270° from its position in FIG. 1 after making a cut in the work, a portion of which is shown below the adapter.
Figure 4A:
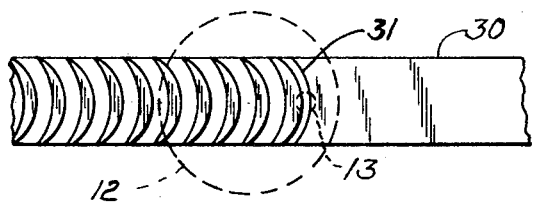
FIG. 4a is a top view of the work illustrated in FIG. 4.

During the operation of the cutting tool adapter when the control member 20 is held stationary and the shaft 11 is rotated by the chuck or other attaching device of the milling machine, the cam follower 21 moves from this position as shown in FIG. 1 rearwardly and downwardly over a curved surface of generally ogee configuration and which is a counterpart to the cam surface shown in FIG. 1 and when it has turned 180° is in a position indicated by dotted lines on the left hand portion of FIG. 4. To move into this position the tool makes a first cut in the work indicated at 30, the cut being indicated at 31. The tool continues around its circular path and when it is moved 270° is in a position shown in FIG. 4. Thereafter the follower 21 rides up the sloping surface of the cam and returns to its position shown in FIG. 1 after moving 360°. The work 30 as illustrated in FIG. 4 and in FIG. 4a has been shown as a portion of a circular metal disc of uniform thickness which is mounted with its center in alignment with the center of the tool in a position indicated by the left hand dotted lines of FIG. 4; the tool is thus positioned so that it will cut a generally radial slot in the edge surface of the disc 30. The slot which is cut by the tool as indicated in FIG. 4a is of circular configuration as formed by the movement of the tool over the arc of curvature produced by its rotation about the center axis of the shaft 11 and tool holder 12. The head of the milling machine is advanced continuously until the slot has been cut in successive increments upon each rotation of the tool and reaches the desired depth. After the cut has been completed the work 30 is indexed to rotate about its center to the position of the next cut. In FIG. 4a the position of the tool as indicated in FIG. 4 is shown in dotted lines as is also the circular outline of the tool holder 12. Cuts already made in the work 30 to full depth are illustrated to the left of the cutting tool position and it will be understood that the work is rotated counterclockwise as viewed in FIG. 4 during the indexing thereof. The product formed by providing the series of slots in the edge of the disc 30 is a turbine wheel having buckets of generally crescent shaped cross section, the circle cut by the inner edge of the tool 13 being smaller than that cut by the outer edge.

It will be readily apparent that the entire machining of the turbine bucket is effected by operation of the cutting tool 13 and the control of the camming action of the adapter assembly. During the operation of the adapter assembly the cutting tool 13 moves into cutting position periodically once during each revolution of the holder 12 and is withdrawn from the cutting position after it has made the cut in the work 30. It will be understood that the design of the cam surface 22 may be made to conform to the particular work operation which is required, and may be made to advance and retract the cutting tool in accordance with the work program. While the circular disc work has been illustrated it will be understood, by way of example, that flat work may be provided with slots in the same manner, the tool moving away from the plane of the top surface of the work before it passes over the work on the return to its position as shown in FIG. 1.

Figure 6:
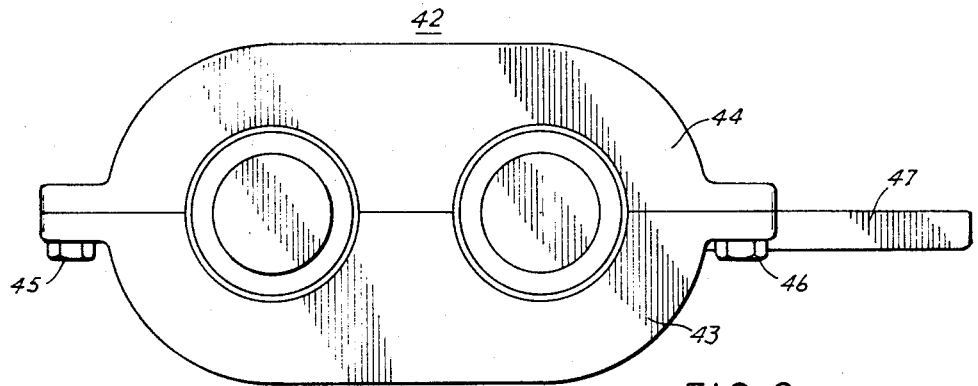
FIG. 6 is a top plan view of the assembly of FIG. 5.
Figure 5:
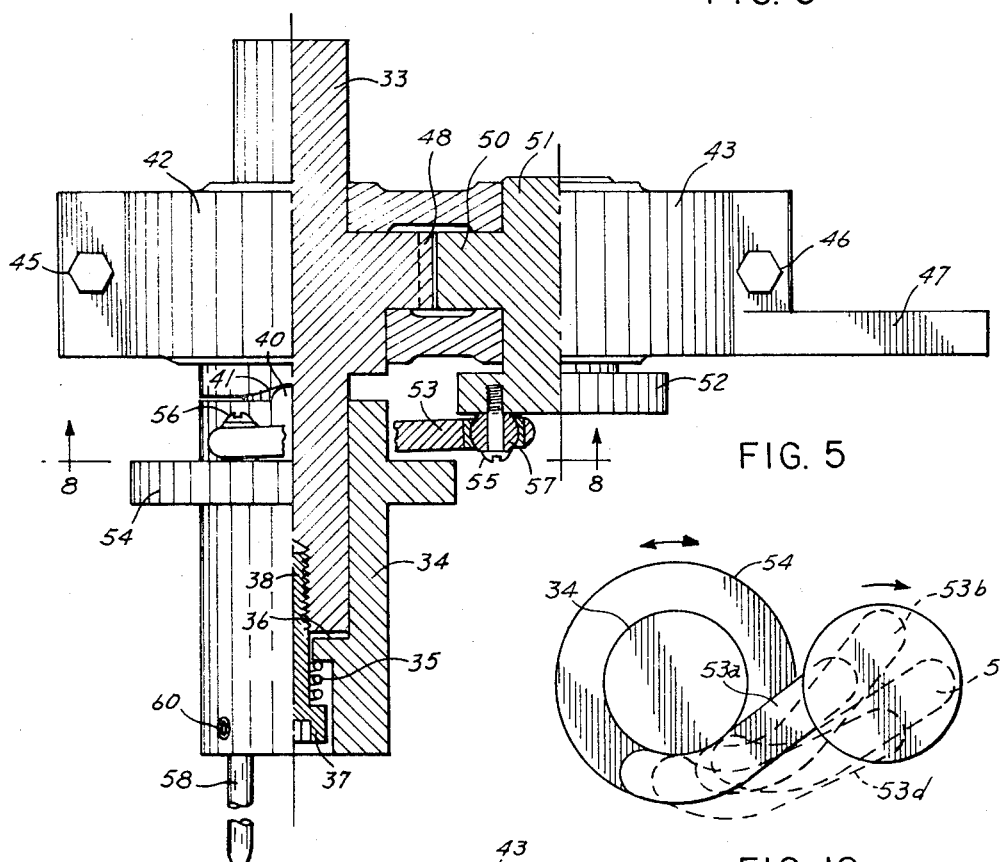
FIG. 5 is a side elevation partly in section of a cutting tool adapter assembly illustrating another embodiment of the invention.
Figure 8:
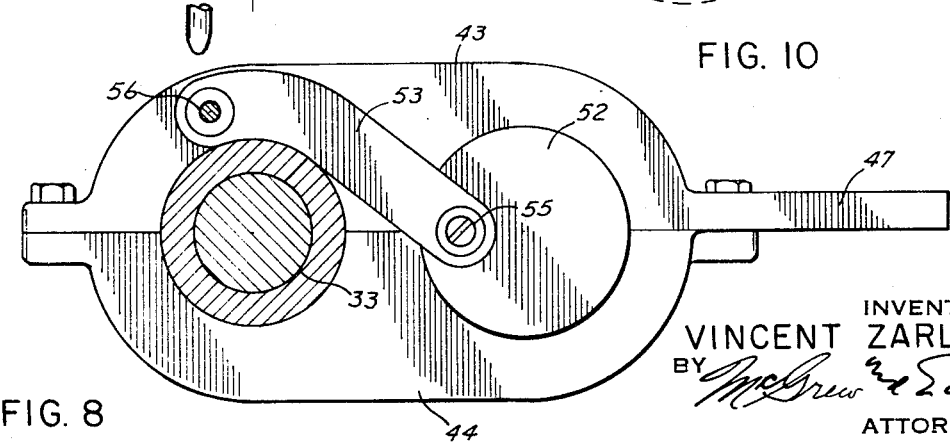
FIG. 8 is a bottom view of the assembly of FIG. 5 along the line 8—8 of FIG. 5.

In the embodiment of the invention illustrated in FIG. 5 the adapter is provided with a driving arrangement whereby a back and fourth movement is imparted to the cutting tool, the camming action producing axial movement of the tool toward and away from the work over the arc of back and forth rotative movement of the tool holder. The adapter assembly of FIG. 5 comprises a shaft 33 having a cylindrical tool holder 34 rotatably mounted on the lower end thereof and movable axially against the pressure of the spring 35; the spring is retained in position between an internal shoulder 36 of the holder 34 and a head 37 of a threaded stud 38 secured in the center bottom end of the shaft 33. The shoulder 36 lies nearest the lower end of the shaft in the extended position of the spring 35 and upon rotation of the tool holder 34, the engagement of cam elements 40 at the top of the holder and 41 on the bottom of the enlarged portion of the shaft 33 moves the holder 34 downwardly against the force of the spring 35 thereby moving the tool toward the work. A gear case 42 as illustrated in FIGS. 5 and 6 constitutes a control member and comprises an elongated body or housing comprising a front half 43 and rear half 44 connected by machine screws 45 and 46. The half portion 43 of the housing is provided with an extension 47 which is arranged to be engaged by a stationary part of the milling machine or other machine tool to hold the control member stationary during the rotation of the shaft 33. The shaft 33 is formed to provide a gear 48 which meshes with a second gear 50 having a shaft 51 extending from both sides thereof and journaled in the housing 42. The rotatable disc 52 is formed at the lower end of the shaft 51 and a link 53 is provided to connect the disc 52 and a collar 54 formed on the cylindrical tool holder 34. The link 53 is pivotally connected to the disc 52 by a suitable screw or threaded member 55 and at the other end to the collar 54 by a similar screw 56. Both the screws 55 and 56 are provided with spherical seats within the respective ends of the link 53, the seat for the screw connection 55 being indicated at 57. FIG. 8 illustrates the position of the link 53 when the pin 56 is at its extreme left hand position and FIG. 9 when the pin is in its extreme right hand position.

Figure 10:
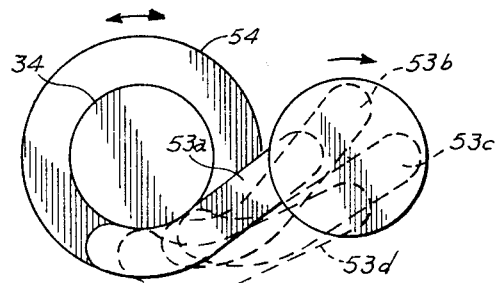
FIG. 10 is a diagrammatic top plan view of the reciprocating drive system of the assembly of FIG. 5.

The operation of the mechanical linkage mechanism is illustrated in FIG. 10 in which four positions of the link have been indicated. The first position, in full lines, and as viewed from below and shown in FIG. 8 is indicated at 53a, this being the position when the screw 55 is in the 9 o'clock position as viewed in FIG. 10. As the disc 52 rotates in a clockwise direction the link 53 reaches a position indicated at 53b which is in the 12 o'clock position. The disc then continues to rotate until it reaches the 3 o'clock position indicated at 53c which is the extreme right hand position of the link as illustrated in FIG. 9. On the continued rotation of disc 52 the link returns towards the position 53a and at 6 o'clock has reached the position indicated at 53d and then returns to the 9 o'clock position. It will thus be clear that the rotation of disc 52 produces a back and forth or reciprocating movement of the flange 54 and the tool holder 34 of which it is an integral part. During the movement of the tool along the circumferential path from the position of the screw 56 in the 53a position of FIG. 10 to its position at 53c and thence back to the 53a position, the tool has moved so that it may be positioned to move back and forth across the work. The cam surfaces 40 and 41 are arranged so that the tool is moved downwardly to its lowermost position and dwells there during a substantial portion of the forward stroke from the position 53a and is lifted from its lowermost position immediately after passing the position 53c. In the embodiment illustrated the gears 48 and 50 are of the same size providing a 1 to 1 ratio and the upper cam surface 41 which is formed on the under side of the hub of the gear 48 is in position to depress the holder 34 and move the tool into engagement with the work only during a selected extent of the right hand portion of the movement of the link mechanism. The cutting tool, indicated at 58, is securely attached to the tool holder 34 by any suitable arrangement and has been illustrated in FIG. 5 as secured by a countersunk set screw 60, the tool 58 having a shank (not shown) extending within the tool holder 34 and a complementary passage in which the shank is engaged and clamped by the set screw 60.

As the tool moves with the tool holder 34 it performs its cutting stroke and returns through a relatively short arc to its initial position during which return it is retracted; thus it will be seen that this embodiment of the invention provides a relatively short stroke tool operation which employs a portion only of a complete revolution of the tool holder 34 to return the tool to its cutting position. The ball and socket joints provided at the screw connectors 55 and 56 afford pivotal and angular movement of the link to produce the reciprocating action of the flange 54 both in the retracted and advanced positions of the tool holder 34. These ball and socket joints are provided so that the screws 55 and 56 hold the spherical block 57 securely in position with respect to the disc 52 and flange 54 respectively. The universal or spherical movement of the link on these pivotal supports is effected by the engagement of the spherical seats in the ends of the link 53 with the outer spherical portion of the spherical members. The inner flat sides of the spherical members are seated securely against the flanges 52 and 54 and the links may pivot universally about the spherical members while their ends are retained by the screws 55 and 56.

In FIGS. 11 and 12 there is illustrated an arrangement for effecting lateral or radial movement of the cutting tool as well as axial movement. By way of example, this device may be employed to cut fins as projections of rectangular cross section instead of the crescent shaped blades illustrated in FIG. 4a. The device of FIGS. 11 and 12 is designed for use on an adapter assembly as illustrated in FIG. 1. In the device of FIGS. 11 and 12 the tool, indicated at 61, is secured on a readily movable tool holding fitting 62 slidably mounted in the lower face of the rotatable tool holder indicated at 63. The control member indicated at 64 is provided with a stop arm or extension member 65 for engagement with a stationary part of the machine tool such as a milling machine to hold the member 64 against rotation. The member 64 is provided with a lower downwardly facing cam surface 66 corresponding to the surface 22 of FIG. 1 and is provided with an upwardly extending cam surface including a cylindrical portion 67 which is of the same diameter as the cylindrical tool holder 63 and with an outwardly extending cam portion 68. The slidable tool holder fitting 62 is biased outwardly from the axis of rotation by a compression spring 70 arranged in the slot in which it is mounted and which urges the slide against the cam surface. The fitting member 62 is of sufficient height to extend upwardly far enough to remain in engagement with the cam surface 67 or 68 regardless of the angular position of the fitting slide and of the position of the tool holder 63 with respect to the control member 64. The sectional elevation view of FIG. 12 illustrates the position in which the bottom faces of the body 63 and control member 64 are substantially flush, and shows the slide 62 and one turn of the spring 70, slide 62 being provided with lateral guide rails 71 and 72 which maintain the bottom of the slide flush with the bottom of the tool holder 63.

During the operation of the adapter 70 illustrated in FIGS. 11 and 12 a cam follower, indicated at 73, which engages the cam surface 66 and effects axial movement of the control member relative to the tool holder 63 in the same manner as the follower 21 and the cam surface 22 of FIG. 1. At the same time and over a length of the circumference of the tool holder 63 determined by the configuration of the cam surface 68 the slide 62 moves the tool outwardly and this movement may be employed to provide a desired cutting operation depending upon the configuration in which the work is being machined. For some applications it may be desirable to eliminate the axial movement by employing the lateral or radial movement of the tool effected by the slide 62 and for such applications the assembly is constructed without the sloping surfaces of the cam 66. The cam for this purpose being provided with a plane surface normal to the axis of rotation of the tool holder 63.

For positive movement of the tool laterally of the axis of rotation of the adapter an assembly arrangement as illustrated in FIG. 13 may be employed. The construction of this arrangement is essentially similar to that of FIG. 11 except for the substitution of a positive positioning cam for the spring biasing of the lateral slide. The corresponding parts of this embodiment have been indicated by the same numerals as employed in FIGS. 11 and 12 with the addition of the suffix letter (*a*). In this embodiment of the invention a slide 75 is provided which extends diametrically across the tool holder 63*a* and carries the tool indicated at 61*a* securely held in the slide. This slide is provided with lateral rails for maintaining it in position in the holder 63*a* as indicated at 71*a* and 72*a* respectively.

The cam surface for the modification of FIG. 13 and as indicated at 76 is designed to maintain the slide 75 in contact with both surfaces 180° apart throughout the 360° of revolution of the tool holder 63*a*. By way of example, this cam has been shown as comprising two arcuate portions 77 and 78 and their complementary cam or guide portions 79 and 80 and each portion of the cam surface 76 is spaced from its 180° opposite portion by a distance equal to the length of the slide 75 with sufficient clearance to afford free rotation.

The operation of the embodiment of the invention illustrated in FIG. 13 is essentially the same as that of the embodiment of FIG. 12.

Figure 14:
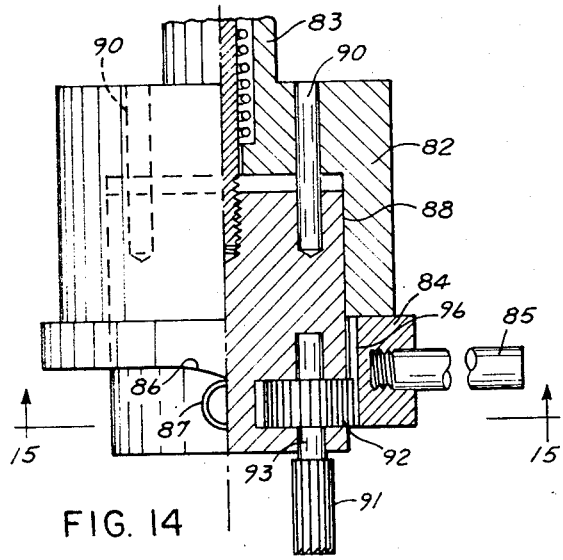
FIG. 14 is a side elevation view similar to FIG. 1 illustrating a further embodiment of the invention.
Figure 15:
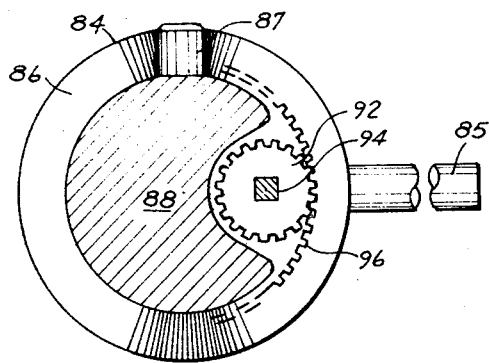
FIG. 15 is a sectional view from the bottom along the line 15—15 of FIG. 14.

The embodiment of the invention illustrated in FIGS. 14 and 15 is essentially similar to the embodiment of FIG. 1 but further includes the arrangement whereby the cutting tool is rotated on its own axis as well as about the axis of the tool holder. As illustrated the adapter assembly comprises a cylindrical body 82 having an upwardly extending stub shaft portion 83 for attachment to the chuck or other connecting device of the machine tool and a control member 84 having a stop member or arm 85 for engagement with a stationary portion of the machine tool. The control member 85 is provided with a downwardly facing cam surface 86 similar to the cam surface 22 of FIG. 1 and a cam follower 87 is mounted on the cylindrical tool holder, indicated at 88, and follows the cam surface 86 when the tool holder is rotated. The tool holder is axially movable with respect to body 82 and is restrained against rotational movement with respect thereto by two sliding pins 90 of essentially the same construction as the pins 14 of FIG. 1.

In order to rotate the cutting tool, indicated at 91, about its own axis as it moves around the axis of shaft 83 a planet gear 92 is mounted on the shaft of the tool 91 indicated at 93 and its rotation with respect to the shaft is prevented by a square portion 94 which fits within a complementary square central hole in the gear 92. The gear is locked to the shaft 94 by a set screw (not shown) and a cylindrical portion of the shaft 93 extends beyond the gear 92 as indicated at 95. The gear 92 extends beyond the side of the tool holder 88 into engagement with an internal gear 96 so that as the tool holder 88 rotates within the control member 86 the smaller gear 92 rotates on its own axis and as a planetary gear around the internal ring gear surface 86. The gears 92 and 96 slide axially with respect to one another during relative axial movement of the body 82 and tool holder 88.

During the operation of the adapter assembly of FIGS. 14 and 15 the tool 91 rotates on its own axis to cut the work with a milling action and is moved axially into engagement with the work and then retracted by cooperation of the cam surface 86 and the cam follower 87. This tool may be employed in a manner essentially the same as that of FIG. 1.

Figure 16:
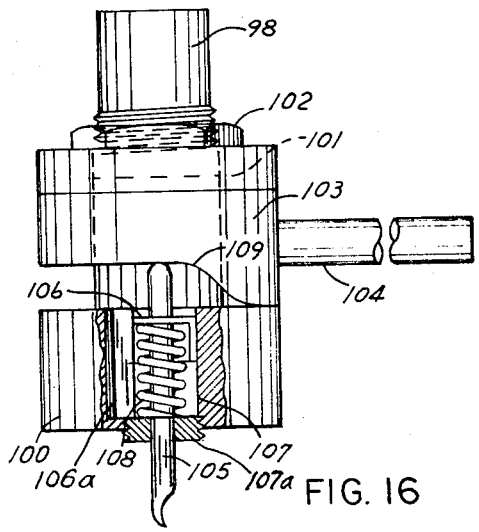
FIG. 16 is a side elevation view partly in section of another embodiment of the invention.
Figure 17:
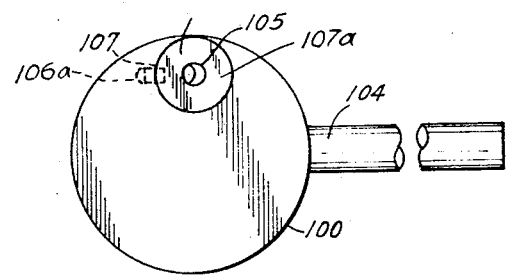
FIG. 17 is a bottom view of the assembly of FIG. 16.

A still further embodiment of the invention is illustrated in FIGS. 16 and 17. In this assembly a shaft 98 is provided for engagement with the chuck or other attaching device of the milling machine and is formed integrally with the lower cutting tool holding member 100. The shaft 98 is provided with a flange or collar 101 which is keyed to the shaft for rotation therewith but may be removed axially after the removal of a nut 102. The adapter is assembled by placing a control member 103 over shaft 98 into position against the tool holding portion 100 then placing the collar 101 in position against the top of the member 103 and threading the nut 102 over the assembly and adjusting it to its desired position. The member 103 is provided with an arm 104 for engaging the milling machine and preventing rotation of the member 103. FIG. 17 which is a bottom view of the assembly of FIG. 16 shows the position of the cutting tool indicated at 105 as eccentric with respect to the axis of the shaft 98 and in a portion of the member 100 outside the shaft 98. The tool 105 extends through an opening in a threaded plug 107*a* in the bottom of the holder 100 and is provided with a guide cup 106 rigidly attached to the tool and which is of the same diameter as a cylinder 107 through which the tool shaft passes. The cup 106 compresses and holds a compression spring 108 in position in the cylinder 107 and also acts as a guide for axial movement of the tool 105. The cup is held against rotation by a key 106*a* mounted in a slot in the member 100 and retained by a set screw or the like (not shown). The spring 108 presses the tool upwardly against a cam surface 109 and as the shaft 98 rotates with respect to the control member 103 the tool is alternately moved downwardly axially by the cam and moved back by operation of the spring 108. Thus the action of the tool 105 in this embodiment is essentially similar to that of the tool 13 in the embodiment of FIG. 1. This is a simplified configuration of the tool adapter assembly and may be found useful for various applications such as relatively light machining operations.

Figure 18:
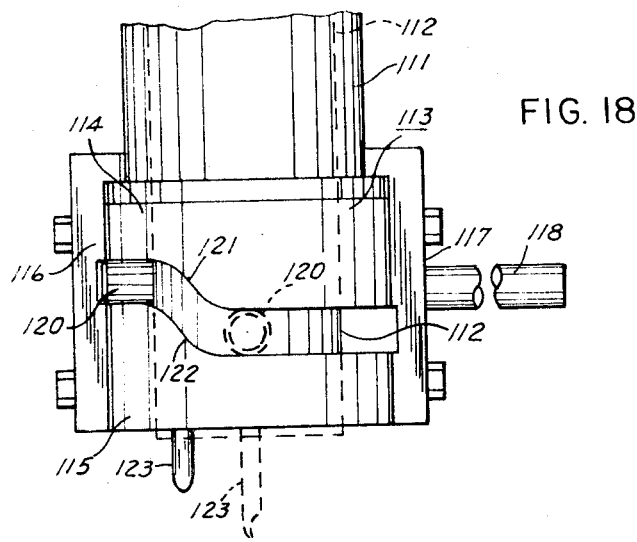
FIG. 18 is a partial side elevation view of a still further embodiment of the invention.

A positive advance and retraction of a cutting tool may be effected by the adapter arrangement illustrated in FIG. 18. In this embodiment the adapter assembly includes a body portion 111 within which a cylindrical tool holder 112 is mounted for axial movement. A control member 113 is provided which comprises an upper portion 114 and a lower portion 115 each of which slidably and axially engages the cylindrical holder 112. The portions 114 and 115 are secured together by tie bars 116 and 117 and a stop member or arm 118 is provided to hold the control member 113 against relative rotational movement with respect to the rotating members 111 and 112. In order to advance and retract the member 112 with respect to the member 113, a cam slot is provided which extends entirely around the control member 113 and a cam follower 120 secured to the cylinder 112 rotates in the cam slot. Cam slot is formed by complementary cam surfaces 121 in the member 114 and 122 in the member 115, and, as the cam follower 120 moves through the slot, it advances the cutting tool indicated at 123 from its full line position to a dotted line position, cylinder 112 shown in dotted lines below the control member 113. The movement of the cutting tool 123 is thus controlled by the camming surfaces in a manner essentially similar to that of the cylinder 12 in FIG. 1.

Adapter assemblies embodying the present invention may be employed on machine tools of the general type indicated regardless of the positioning of the rotational axis which may be vertical, horizontal or at some other angle. The operation of advancing and retracting the cutting tool being the same regardless of position and its use being effected in a manner depending upon the configuration of the work to be machined.

I claim:

1. An adapter for mounting a cutting tool on a milling machine or the like and for effecting periodic movement of the tool into work engaging position comprising a drive shaft for attachment to the chuck or other driving element of the milling machine or the like, a cutting tool holder mounted on said adapter for rotation about the axis of said shaft, means for mounting a cutting tool in said holder, means for imparting rotary driving movement from said shaft to said holder, a control member on said adapter mounted for rotation about the axis of said shaft, means for restraining rotary movement of said control member about said axis, cam means dependent upon the restraining of said control member and rotary movement of said holder with respect to said control member for producing movement of said tool holder with respect to said shaft whereby a tool in said holder is moved periodically toward and away from its work engaging position, and for effecting said means for imparting rotary movement to said holder comprising a gearing in said control member, a first eccentric drive pin driven by said gearing about an axis laterally spaced from the axis of said drive shaft, a second eccentric pin on said tool holder, and a link connecting said eccentric pins, said second pin on said holder being positioned radially further from its axis of rotation than said first pin from its axis of rotation whereby a reciprocating rotary movement is imparted to said tool holder when said control member is held stationary.

2. A driving assembly for a cutting tool of a milling machine or the like having a driving element rotatable about a fixed axis for effecting periodic movement of the tool with respect to the machine toward and away from a work engaging position comprising:

a cutting tool holder mounted in said assembly for rotation about a fixed axis, means for mounting a cutting tool eccentrically in said holder, means connecting the driving element of the milling machine or the like and said holder for imparting reciprocating rotary driving movement to said holder, means relatively rotatable with respect to said holder and utilizing such relative rotation produced by said driving element for producing movement of said tool holder with respect to the machine along the axis of said holder whereby a tool in said holder is moved toward and away from its work engaging position periodically at a rate dependent upon the speed of rotation of said driving element.

3. A driving assembly for a cutting tool of a milling machine or the like as set forth in claim 2 wherein the tool in said holder is moved toward and away from the work at least once during each cycle of rotary movement of said holder.

4. A driving assembly for a cutting tool of a milling machine or the like as set forth in claim 2 wherein, said connecting means comprises a rotatable member mounted for rotation about a second axis spaced from and parallel to said first mentioned axis, means connecting said driving element and said member for rotating said member, a link pivotally connected to said rotatable member at one end and to said tool holder at its other end, said pivotal connections of said link to said member and said holder being spaced from the respective axes of said member and said holder, the eccentricity of said pivotal connection on said holder being greater than that of the pivotal connection on said member whereby continuous rotation of said member in one direction about its axis effects reciprocating rotary movement of said holder about its axis.

5. A driving assembly for a cutting tool of a milling machine or the like as set forth in claim 4 wherein said pivotal connections include ball joints for affording at least limited relative movement of said link in planes parallel to said axes during movement of said holder along its axis.

* * * * *